INVENTOR.
DENNIS D. FORTE
ATTORNEY

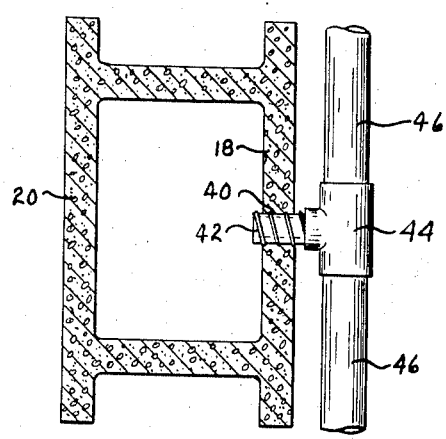
FIG. 5
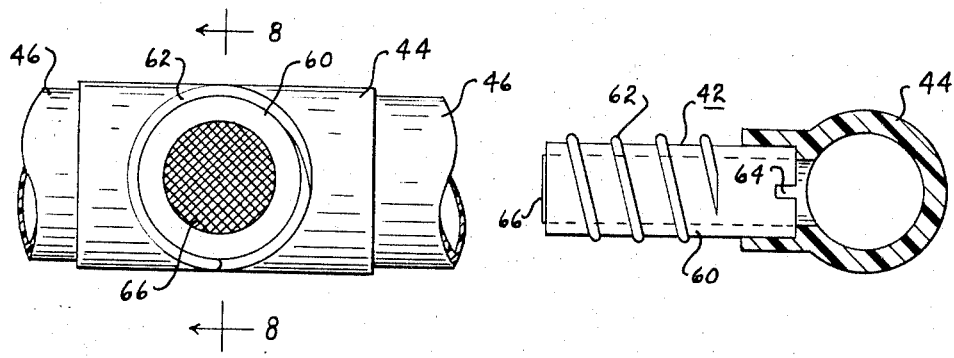
FIG. 7
FIG. 8

United States Patent Office 3,426,487
Patented Feb. 11, 1969

3,426,487
BASEMENT DRAINAGE SYSTEM
Dennis D. Forte, Mishawaka, Ind.
(61667 Locust Road, South Bend, Ind. 46614)
Filed Mar. 24, 1967, Ser. No. 625,842
U.S. Cl. 52—1      9 Claims
Int. Cl. E04b 1/64; E04h 9/00; E04d 13/04

ABSTRACT OF THE DISCLOSURE

A drainage system for basements and the like having a floor and a wall with cavities, cracks, fissures and similar voids, including conduit means connected from the inside wall surface with the voids, a motor driven pump connected to the conduit means for positively removing the water, and a control for the motor for intermittently removing the water from the wall or floor structure. The control means for the motor may be responsive to external conditions.

---

In modern basement construction, the walls and often the floors are waterproofed or leakproofed so that, notwithstanding the fact that the lower part of the basement is well below the ground water level, the basement remains free of seepage from ground water through the walls and floors. Most new construction remains seepage-free for some time, regardless of whether the walls are of poured concrete construction or of block construction, the seepage being prevented primarily by sealing the external surface of the walls with tar or asphalt before the ground is filled in around the building structure. In spite of the coating of sealing material on the walls, however, in time cracks often develop in the walls and floors which permit sepage to occur. Various methods and practices have been tried and used in the past, including partial removal of the ground along the wall for resealing the wall, injecting sealing material into the ground along the wall to seal the cracks externally, and treating the internal surface of the walls to seal the cracks from the inside. None of these prior practices have been entirely successful and they have often been relatively difficult, inconvenient, and expensive to perform. In new construction, the sealing practices have occasionally been used in conjunction with a drainage system along the base of the walls and under the floors; however, since the water often reaches the cracks in the walls before it reaches the drainage system, seepage occurs as soon as cracks and fissures develop in the walls and floors. A further approach to the problem of seepage through the walls and floors has been to control the drainage from the walls so that the water does not flow into the usable space in the basement. These controlled drainage systems have for the most part been ineffectual and/or have only partially solved the problem. It is therefore one of the principal objects of the invention to provide a drainage system and apparatus for a basement and the like which effectively removes water seeping into the walls and floors of the basement before it has had a chance to flow therefrom into the usable space in the basement, and which positively withdraws the water and discharges it into a drain.

Another object of the invention is to provide a system of the aforesaid type utilizing a pump or other positive means to remove the water from the walls and floor, which is operated automatically in response to weather conditions, such as rain or the melting of snow and ice on and around the building structure.

Still another object is to provide a highly versatile drainage system which can be easily adapted to various basement structures and designs and which can be modified from time to time as further cracks or fissures develop in the walls, and which can effectively be used to maintain a basement free of water seepage even though the original construction was defective and permitted seepage through joints in the concrete structure.

Further objects and advantages of the invention will become apparent from the following description and accompanying drawings, wherein:

FIGURE 5 is an enlarged fragmentary cross-sectional view taken on line 5—5 of FIGURE 1 showing the details of one embodiment of the present invention;

FIGURE 7 is an enlarged elevational view of a fixture used in the present system;

FIGURE 8 is a vertical cross-sectional view of the fixture shown in FIGURE 7.

The present invention is primarily concerned with a system for removing water seeping into and/or through walls of basements and similar underground compartments. The water is preferably removed by suction from a pump through a series of conduits connected to voids, cracks, fissures in the wall. Various means may be used to control the operation of the pump including a means responsive to precipitation.

Figure 1:
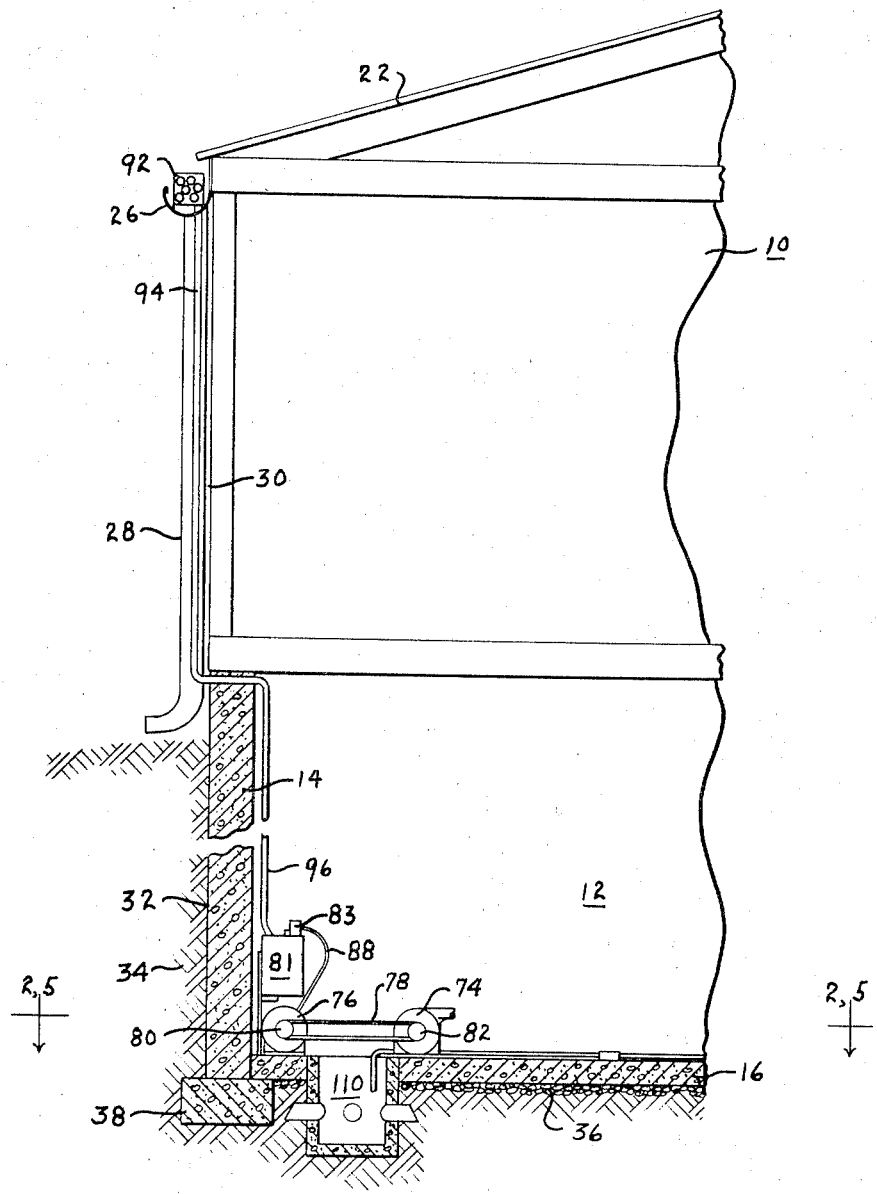
FIGURE 1 is a vertical cross-sectional view of a building structure such as a house, showing the basement and surrounding ground in cross section and the present system installed in the structure.

Referring more specifically to the drawings, and to FIGURE 1 in particular, numeral 10 designates generally the building structure in which the present drainage system has been installed. Numeral 12 designates the basement having a wall 14 and floor 16 which, for the purpose of the present description, are considered conventional, the walls in the structure shown being constructed of concrete block material with cement joints therebetween, the blocks having inside and outside walls 18 and 20 and a series of hollow chambers. The blocks are conventional and of well known design and are extensively used in home building construction. The building structure 10 also includes a roof 22 having an eaves trough 26 and downspout 28 extending down along the side wall 30 of the house above basement wall 14. In the conventional construction, the external surface 32 of wall 14 is coated with asphalt or tar before ground 34 is filled in during the construction of the building. Normally a layer of gravel, crushed stone or the like 36 is placed beneath the basement floor 16, and in some homes, a drainage system consisting of a series of open jointed or perforated tiles is embedded beneath the floor and near the bottom of wall 14 adjacent footing 38. The foregoing construction when initially completed is substantially waterproof and seepageproof, and little difficulty is encountered in maintaining the basement in a dry and satisfactory condition, and effectively protected from ground water along basement wall 14 and under floor 16. However, as a result of the ground settling, and normal shrinkage and expansion of the walls, small cracks or fissures develop in the walls, usually following the joints between the cement blocks. These joints permit the ground water to seep into the hollow interior of the blocks and thence find its way through other cracks and fissures into the usable basement space.

Figure 2:
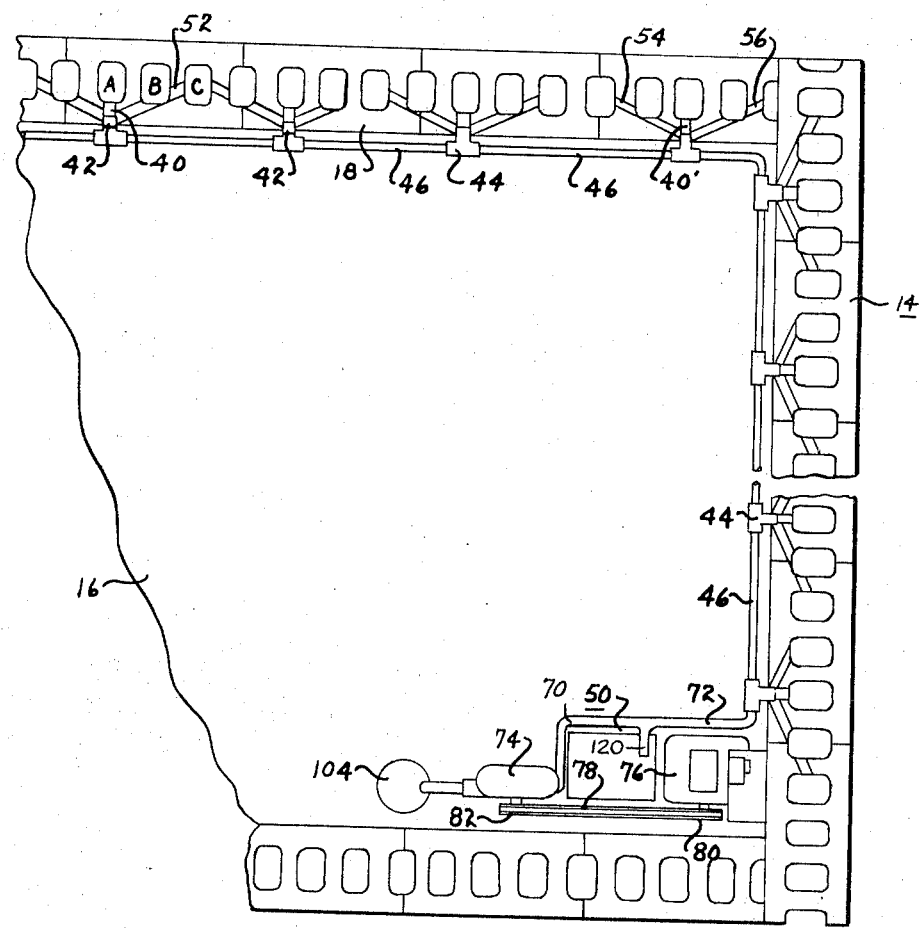
FIGURE 2 is an enlarged fragmentary horizontal cross-sectional view of the structure shown in FIGURE 1, the section being taken on line 2—2 of FIGURE 1.
Figure 6:
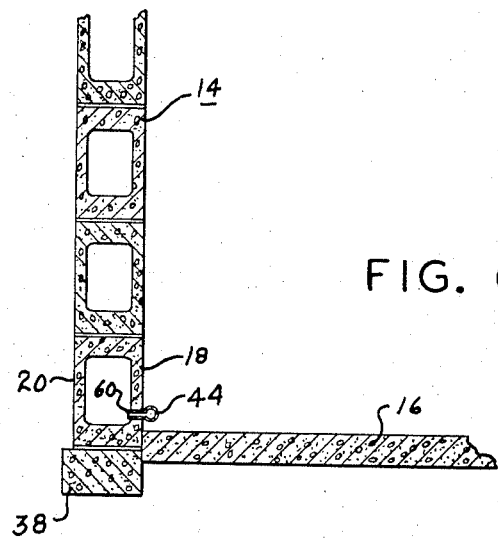
FIGURE 6 is an enlarged vertical cross-sectional view of a portion of one of the basement walls and floor, similar to the cross-sectional view shown in FIGURE 1.

In the present system, holes 40, for example, are drilled through the internal wall 18 of the concrete block into the hollow interior thereof, and a nipple 42 is inserted tightly into each hole, preferably with a sealing compound. The nipples are placed along the base of the wall adjacent the floor, as shown in FIGURE 6, and a T 44 is attached to the nipple, and conduit sections 46 are placed between the T's to form a continuous drain conduit connected to a centrally located water disposal apparatus generally indicated by numeral 50. Preferably, the nipples, enlarged views of which are shown in FIGURES 5, 7 and 8, are constructed of metal, and the T's 44 and conduit sections 46 are preferably formed of plastic. The T's and conduit sections are preferably placed on or near the floor and adjacent wall, thus rendering them inconspicuous and out of the way of normal use of the basement. As illustrated in FIGURE 2, a single nipple may drain two or more chambers of the concrete blocks. For example, a channel 52 drilled angularly from hole 40 intersects lower portions of compartment chambers B and C and hence these chambers are drained along with chamber A through nipple 42. As illustrated at numeral 40', two angular channels 54 and 56 connect with the hole for nipple 42, and the single nipple drains five separate compartments. The arrangement of these angular channels permits effective draining with a minimum number of nipples, and hence reduces both the cost of the system and installation thereof.

The nipples used in the installation as shown in FIGURES 6 and 7 preferably consist of a cylindrical sleeve-like portion 60 with coarse threads 62 on the external surface thereof for engaging the side of the hole drilled through the internal surface of the block. A slot 64 is provided for receiving a tool used in inserting the nipple in the hole. A screen 66 may be used to prevent sand, grit or other foreign material from finding its way into the apparatus and reducing its efficiency.

Figure 4:
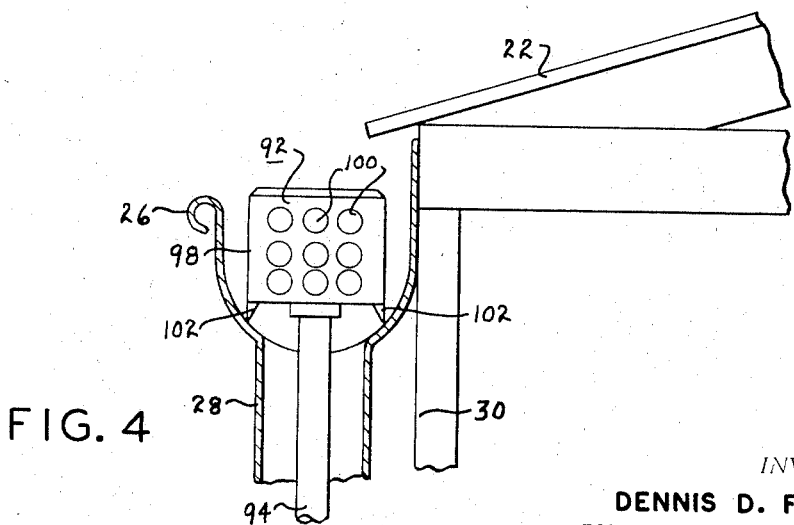
FIGURE 4 is an enlarged fragmentary cross-sectional view of a portion of a building structure adjacent the eaves thereof, showing a portion of the present apparatus installed therein.

In order positively to remove the water from the wall, a conduit drain consisting of a section 72 and sections 46 and T's 44, is connected directly to the inlet conduit 70 of a centrifugal pump 74 driven by a motor 76 through a belt 78 on pulleys 80 and 82 on the motor and pump, respectively. When the pump is operating, the suction created by the pump is transmitted from the pump through conduit 70 and sections 72 and T's 44 to the cavities in the wall. The water is removed efficiently and quickly from the compartments in the wall as it enters. The effect of suction in the wall cavities not only removes the water in the cavity, but also draws the water from the surrounding wall structure, thus preventing any seepage of water to the inside surface of the wall and preventing the water from entering the basement. The pump may be operated for an extended period of time, positively sucking the moisture from the wall cavities and pores to facilitate maintaining the wall in an essentially dry condition. The pump and motor apparatus may be manually operated; however, an automatic control is preferably used. The one shown in the drawing is responsive to external weather conditions, such as rain and melting snow and ice on and around the building structure. The control consists of a container 81 and a water level responsive switch 83, the switch being controlled by a float mechanism 85 in container 81. A drain is provided for container 81 and consists of a tube 86 connected to the lower end of the container and to the inlet 70 of pump 74, the motor being connected to switch 83 by line 88. Switch 83 responds to variations in water level in container 81 which receives water from an eaves trough through a connection such as that illustrated in FIGURES 1 and 4. When the water from rain or melting snow and ice on the roof reaches eaves trough 26, a small amount of water is diverted through a collector 92 and tube 94, the lower end 96 of which drains into the container. The collector shown in the drawings consists of a cylindrical body 98 having a plurality of holes 100 to permit the water to flow from the eaves trough into the collector and thence into tube 94. The collector is loosely fitted in the trough, preferably with a plurality of spaces 102, so that the collector will not interfere with the normal drainage of the eaves trough into downspout 28. Tube 94 extends downwardly from collector 92 through downspout 28 to a point near the upper part of basement wall 14, and thence extends through the wall of the downspout, and over or through the basement wall, and downwardly to container 81. When water from roof 22 reaches the eaves trough, it flows through collector 92 downwardly through tube 94 into container 81, and as the container fills, float 85 is raised, actuating switch 83, which in turn starts motor 76 to drive pump 74. The pump withdraws the water from the compartments in the cement block wall through conduit 72 and 70 and discharges it into a drain 104 or other suitable disposal outlet.

Figure 3:
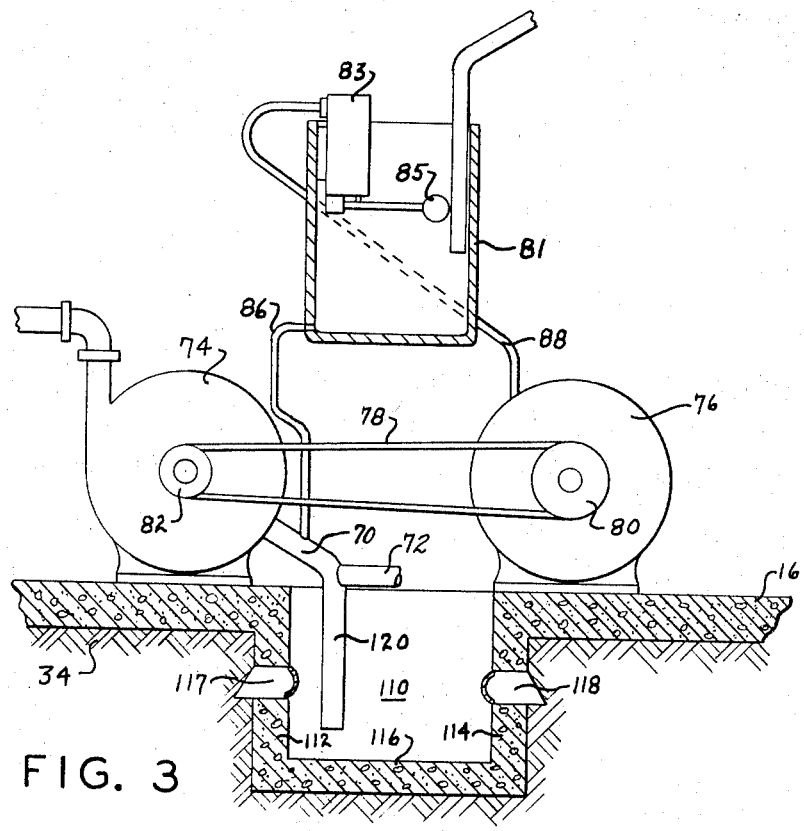
FIGURE 3 is an enlarged view of a portion of the apparatus constituting the present system, the view showing a portion of a basement floor in cross section.

In order to remove the water beneath the basement floor and thereby to prevent seepage through cracks, fissures and pores in the floor, a drain system illustrated in FIGURE 3, consisting of a sump 110 formed by walls 112, 114 and bottom 116, is used. The sump is connected to the gravel or loose material beneath the floor by drain outlets 117 and 118 in walls 112 and 114, respectively. As the water drains into sump 110, it is removed by pump 74 through pump inlet conduit 120. In large basements, or where the drainage beneath the floor is poor, several sumps may be used in conjunction with one or more pumps, and these sumps can readily be placed in the floor by removing a section of concrete the size of the sump, and then sinking the sump in the gravel or soil beneath the removed section.

While the present invention has been described with reference to basement walls constructed of concrete block, this system is also usable in connection with poured concrete walls. In installations involving a solid poured concrete basement wall, if cracks, fissures or other voids develop in the walls, or if the wall is found to be porous in a certain limited area, the crack, fissure or porous area is plugged at the inside surface of the wall, and a nipple is placed at the bottom of this void, preferably near the basement floor. The conduit from the nipple may be connected directly to the inlet of the pump, which prevents any appreciable hydrostatic pressure in the crack, fissure or porous area which might dislodge or penetrate the sealing material at the inside surface of the wall. The water in those defective areas drains to a point near the bottom thereof, where it is effectively removed through the nipple and conduit 70. The system is otherwise the same as that described with reference to the concrete block type wall construction.

Figure 9:
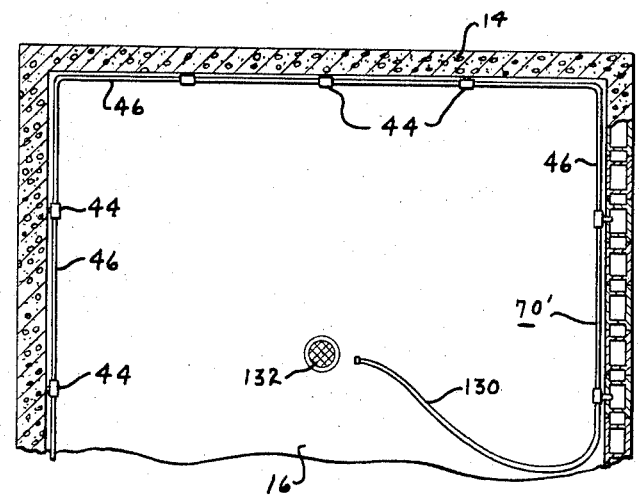
FIGURE 9 is a horizontal cross-sectional view of the basement wall taken on a plane similar to that of FIGURE 2, showing a modified form of the present system.

A further modified form of the present invention is illustrated in FIGURE 9 in which the wall structure is of the concrete block type, and a conduit 70, including the nipples, T's, and interconnecting sections, is merely connected to a drain. The conduit, indicated by numeral 70', terminates in a drain section 130, the outlet of which is placed near a drain 132. This type of construction is preferably used where only a small amount of water is likely to find its way into the wall structure. However, the angular channels such as those illustrated at numerals 52, 54 and 56, may be effectively used in this modified form of the system, and the nipples similar to those shown in FIGURES 5, 6, 7 and 8 are used in the installation.

While several modifications of the present system and the apparatus used in conjunction therewith have been described in detail herein, other changes and modifications may be made without departing from the scope of the invention.

I claim:

1. A drainage system for building structure basements and the like having a floor and a wall with cavities, compartments, cracks, fissures or similar voids through which and in which water may pass or collect, said system comprising a plurality of conduit means inserted in said wall from the inside and near the bottom thereof and connecting with said voids, a conduit connected to said conduit means, a pump, means connecting said conduit directly to the intake of said pump for transmitting pump vacuum to said voids, a motor for driving said pump to discharge the water collected in or passing through the voids, and means for controlling the operation of said motor.

2. A drainage system for basements and the like as defined in claim 1 in which the means inserted in the wall is connected by channels to a plurality of voids.

3. A drainage system for basements and the like as defined in claim 1 in which the means inserted in the wall includes a nipple having external threads thereon for engaging the wall.

4. A drainage system for basements and the like as defined in claim 3 in which a T member is connected to said nipple and conduit sections are connected to said T.

5. A drainage system for basements and the like as defined in claim 1 in which the means connecting said conduit to the pump includes a sump into which said conduit drains, and means connecting said sump with the area beneath the floor of said basement.

6. A drainage system for basements and the like as defined in claim 1 in which the means for controlling the operation of the motor includes means responsive to a water condition external of the building structure.

7. A drainage system for basements and the like as defined in claim 5 in which the means for controlling the operation of the motor includes means responsive to a water condition external of the building structure.

8. A drainage system for basements and the like as defined in claim 1 in which said means for controlling the operation of the motor includes a container, a collector disposed in the eaves trough of the building disposed externally of the building structure, and a conduit connecting said collector with said container, and a switch responsive to the level of the water in said container for starting and stopping said motor.

9. A drainage system for basements and the like as defined in claim 7 in which said means for controlling the operation of the motor includes a container, a collector disposed in the eaves trough of the bulding disposed externally of the building structure, and a conduit connecting said collector with said container, and a switch responsive to the level of the water in said container for starting and stopping said motor.

References Cited

UNITED STATES PATENTS

| | | | |
|---|---|---|---|
| 1,891,934 | 12/1932 | Joy et al. | 52—221 |
| 2,147,035 | 2/1939 | Henderson | 52—221 |
| 2,410,338 | 10/1946 | Craine | 52—198 |
| 2,717,513 | 9/1955 | Smart | 52—303 |
| 3,017,722 | 1/1962 | Smith | 52—169 |
| 3,057,285 | 10/1962 | Wheeler | 52—303 |

FOREIGN PATENTS

| | | |
|---|---|---|
| 158,163 | 1/1933 | Switzerland. |
| 642,803 | 3/1937 | Germany. |

HENRY C. SUTHERLAND, *Primary Examiner.*

U.S. Cl. X.R.

52—12, 169, 173, 221, 505